United States Patent Office 3,304,336
Patented Feb. 14, 1967

3,304,336
DEHYDROCHLORINATION OF POLYCHLORI-
NATED HYDROCARBONS
William A. Callahan, Holland, Mich., assignor to Detrex
Chemical Industries, Inc., Detroit, Mich., a corporation
of Michigan
No Drawing. Continuation of application Ser. No.
170,261, Jan. 31, 1962. This application May 27, 1964,
Ser. No. 370,713
12 Claims. (Cl. 260—654)

This application is a continuation of copending application Serial No. 170,261, filed January 31, 1962, now abandoned.

This invention relates to an improved process for the preparation of polyhalogenated unsaturated hydrocarbons by the dehydrohalogenation of polyhalogenated saturated hydrocarbons. More particularly, this invention comprises a process for the elimination reaction of hydrogen chloride from polychlorinated ethanes in which three chlorine atoms are attached to one carbon atom. Thus 1,1,1-trichlorethane upon dehydrohalogenation yields vinylidene chloride and hydrogen chloride; 1,1,1,2-tetrachloroethane upon dehydrochlorination yields trichlorethylene and hydrogen chloride; and pentachlorethane upon dehydrochlorination yields perchlorethylene and hydrogen chloride.

Heretofore, chlorination of ethane has been known and several commercial processes therefor have existed. It is usually carried out at relatively high temperatures, and in spite of close control to yield products of the desired state of chlorination, a certain amount of less desirable products results. Of these less desirable products, 1,1,1,2-tetrachlorethane (asymmetrical tetrachlorethane), hereinafter referred to as a-tetra, methylchloroform, and pentachlorethane are frequently encountered. However, such chlorination of ethane is practiced since ethane is a more economical source of $C_2$ than either ethylene or acetylene. Even using these sources, direct chlorination results in relatively small yields and in the production of less desirable chlorinated $C_2$ compounds. a-Tetra is one of the higher chlorinated $C_2$ compounds frequently encountered. It appears to have no commercial significance. However, its dehydrochlorinated derivative, trichlorethylene, is very important commercially. The boiling point of a-tetra is reported to be about 129°–130° C.

a-Tetra may be converted into trichlorethylene and hydrogen chloride by treating a solution of a-tetra in a solvent, such as perchlorethylene, with ferric chloride and boiling the mixture for long periods of time. As much as sixteen (16) hours is usually required to convert as little as 1% a-tetra in perchlorethylene into a concentration of a-tetra undetectable by such usual means as gas chromatography. Similarly a solution of a-tetra in perchlorethylene may be treated with aluminum chloride and the a-tetra content reduced more rapidly, but the aluminum chloride has the disadvantage of producing large quantities of tar and decreases the yield of trichlorethylene by reactions which also involve the solvent, perchlorethylene. Because of the proximity of the boiling points of perchlorethylene and a-tetra, it may be advantageous at times to convert the a-tetra to trichlorethylene and thus render the two components more readily separable. Aluminum chloride has a further disadvantage in that it exerts a considerable vapor pressure at about 120° C., and tends to distill over. It is, of course, a difficult and expensive operation to remove aluminum chloride by washing and redistilling the solvent.

Vinylidene chloride has heretofore been prepared by treating 1,1,2-trichlorethane with alcoholic potassium hydroxide or with excess aqueous calcium hydroxide at 70–80° C. It has also been prepared by treating methylchloroform with aqueous calcium hydroxide. These processes have the disadvantage that the reaction does not go to completion, thereby requiring an expensive separation step, and since the hydrogen chloride produced is taken up by a basic substance, it is therefore not available in a commercial by-product form. Vinylidene chloride has also been prepared by passing methylchloroform vapors over various metal chloride catalysts. These processes have the disadvantage of requiring the methylchloroform to be in the vapor phase and also that a certain amount of tarring occurs rendering the catalyst quickly ineffective. When methylchloroform is treated with some metal halides capable of causing its dehydrochlorination, in the liquid phase, a certain amount of high boiling material is made by condensation of vinylidene chloride with itself or with methylchloroform. This, of course, detracts from the yield of vinylidene chloride.

Pentachlorethane has been successfully dehydrochlorinated by treatment with a lime slurry to yield perchlorethane may be passed over activated carbon at about 250° duced exists in an unsalable form. Also, pentachlornitrobenzene (nitrotoluenes), chlorinated nitrobenzenes C. and catalytically cracked to produce perchlorethylene and hydrogen chloride. This process has the disadvantage that considerable heat is employed at a cost and the pentachlorethane is not completely cracked. Also, the perchlorethylene must be separated from the pentachlorethane and the latter recycled.

It has now been discovered that the above-described polychlorinated saturated hydrocarbons wherein three halogen atoms are attached to one carbon atom, may be successfully dehydrohalogenated, yielding the corresponding unsaturated polychlorinated hydrocarbons, while at the same time avoiding the above-described disadvantages.

It has now been discovered that these polychlorinated hydrocarbons, having three chlorine atoms on one carbon atom, may be successfully dehydrohalogenated by heating such compounds in the presence of a novel catalytic composition comprising a complex system of anhydrous aluminum chloride and a nitrobenzene or a substituted nitrobenzene. Such complex compositions may be made for the practice of the process of this invention by combining essentially molecular proportions of anhydrous aluminum chloride and either nitrobenzene itself, methyl nitrobenzenes (nitrotoluenes), chlorinated nitrobenzenes (monochloro, dichloro, etc.), nitrophenols (hydroxy nitrobenzenes), and alkoxy nitrobenzenes. The term molecular proportions as used herein takes into consideration the number of nitro groups attached to the benzene derivative. Dinitro-phenol contains two nitro groups, each of which may react with a mole of aluminum chloride, so that two distinct complexes may result. On the other hand, o-chloronitrobenzene contains one nitro group which will react with aluminum chloride, the chlorine attached to the benzene being regarded as not functional in the sense used herein. Hydroxy and alkoxy groups likewise are not functional as used herein.

These aluminum chloride complexes with nitrobenzenes are readily prepared by combining anhydrous aluminum chloride and nitrobenzene or a nitrobenzene derivative. The two compounds are mixed and heated if necessary until homogeneous. If the nitrobenzene compound is a solid, it may be melted and the molecular proportion of anhydrous aluminum chloride added thereto. Another method of preparation is to dissolve or disperse the nitrobenzene compound in a suitable solvent such as perchlorethylene, symmetrical tetrachlorethane, or the like and to then add the molecular proportion of aluminum chloride thereto. Solubility of the complex compound is not a requisite for its functioning in accordance with the process of this invention. The complex may be separated from the medium in which it was made, or it may be used therein as desired.

Accordingly, a-tetra may be dehydrochlorinated quantitatively at about its boiling point in the presence of the above-described complexes of anhydrous aluminum chloride and a nitrobenzene compound. Similarly, pentachlorethane may be dehydrochlorinated by heating at or below the boiling point thereof in the presence of these aluminum chloride-nitrobenzene compound complexes, with the resultant production of perchlorethylene and hydrogen chloride. Additionally, methylchloroform may be likewise dehydrochlorinated by treatment with an aluminum chloride-nitrobenzene compound complex in accordance with the process of this invention, thereby producing vinylidene chloride and hydrogen chloride in good yield and without formation of tars and other by-products.

*Example 1*

To 815 gms. (500 ml.) of perchlorethylene were added 16.6 gms. a-tetra and 24.6 gms. (0.2 mole) of nitrobenzene. To this mixture was added 23.6 gms. (0.2 mol) anhydrous aluminum chloride. The aluminum chloride reacted with the nitrobenzene to form a complex compound soluble in the perchlorethylene and an orange colored solution resulted. This solution was contained in a flask equipped with a reflux condenser and a heating mantle. The mixture was heated to gentle reflux and so maintained. Samples were periodically withdrawn and analyzed for unreacted a-tetra. When no unreacted a-tetra was found the experiment was over. The time for the total conversion of a-tetra was as recorded in Table 1.

In a similar manner other aluminum chloride-nitrobenzene derivative complexes were formed and their efficacy as dehydrochlorination catalysts for a-tetra was determined. Table 1 shows the results of these experiments.

TABLE 1

| Nitrobenzene derivative | Conc. of nitro-compound, mol/liter | Conc. of anhydrous AlCl$_3$, mol/liter | Time to completely convert a-tetra |
| --- | --- | --- | --- |
| Nitrobenzene | 0.4 | 0.4 | 4½ hours. |
| p-Nitrotoluene | 0.4 | 0.4 | 4 hours. |
| o-Nitrotoluene | 0.4 | 0.4 | ½ hour. |
| o-Chloronitrobenzene | 0.1 | 0.1 | 1 hour. |
| p-Chloronitrobenzene | 0.4 | 0.4 | Do. |
| 2,5-dichloronitrobenzene | 0.4 | 0.4 | 1 hour. |
| 2,4-dinitrophenol | 0.2 | 0.4 | ½ hour. |
| Trinitrophenol | 0.0325 | 0.1 | 1 hour. |

*Example 2*

The apparatus used in this example was a fractionating column 20 mm. O.D. and packed 48" with ⅛" glass helices. A variable take-off still head was used. A 500 ml. flask served as a boiler.

Into the boiler was charged 200 ml. of a 0.2 molar solution of aluminum chloride-2,5-dichloronitrobenzene complex in perchlorethylene. This solution was brought to boiling and the overhead vapors were at the temperature of boiling perchlorethylene. At this time a-tetra was slowly let into the boiler through a dropping funnel attached thereto. The overhead vapor temperature then dropped to the boiling point of trichlorethylene. Until this point in time the column was operating under total reflux. A slow take-off of the trichlorethylene was started. The a-tetra addition, 50 ml. in all, took place over a period of 1¼ hours. During this time trichlorethylene was being taken off overhead. After the a-tetra addition had been completed the rest of the trichlorethylene was fractionated off. A yield of 86.5% of the theoretical amount of trichlorethylene was obtained. The hydrogen chloride formed during the reaction was vented to the atmosphere.

The above example illustrates how the process of this invention can be made to be continuous. It is not necessary that perchlorethylene be used in the boiler. In this case it was desired to estimate the yield obtainable, and trichlorethylene can be easily fractionated from perchlorethylene in the apparatus used.

*Example 3*

To 318 gms. of symmetrical tetrachlorethane were added 7.8 gms. of 2,5-dichloronitrobenzene and 5.3 gms. of anhydrous aluminum chloride. This resulted in a solution of a concentration of 0.2 molar with respect to the aluminum chloride-nitrobenzene compound complex. To this solution was added 16.1 gms. of pentachlorethane. This mixture was brought to boiling under reflux. After two hours reflux a sample was withdrawn and analyzed for perchlorethylene. It was found that 86.3% of the theoretical amount of perchlorethylene had been formed. The hydrogen chloride formed during the reaction was vented to the atmosphere. No tarring had occurred in the solution.

The above example illustrates a manner in which the principle of the invention may be applied to the manufacture of perchlorethylene. The use of symmetrical tetrachlorethane was not necessary to the practice of the invention. Perchlorethylene may as well have been used, or even pentachlorethane itself. Obviously, the process could be made continuous by continuously dropping in pentachlorethane and removing perchlorethylene and hydrogen chloride as they are formed.

*Example 4*

To 100 ml. of methylchloroform in a distillation apparatus were added 20.5 gms. of aluminum chloride nitrobenzene complex. When this mixture was distilled without prior reflux a large amount of dehydrochlorination took place. The products were vinylidene chloride and hydrogen chloride.

The hydrogen chloride was trapped in an absorber. A total of 36.8 gms. of both products was distilled from the flask. The yield of vinylidene chloride was determined from the total amount of hydrogen chloride in the condensate and in the absorber. A total of 5.01 gms. of hydrogen chloride was so obtained, as shown by analysis, which amounted to 49.9% of the theoretical amount.

It is obvious that the process of Example 4 may be made continuous by the employment of an apparatus such as a fractional distillation apparatus. The methylchloroform may be continuously fed to the still and the vinylidene chloride and hydrogen chloride formed continuously removed by fractionation.

Having thus described my invention, I claim:

1. In a method of effecting the dehydrochlorination of a polychlorinated hydrocarbon compound selected from the group consisting of 1,1,1-trichlorethane; 1,1,1,2-tetrachlorethane; and pentachlorethane, the step which comprises eliminating hydrogen chloride by heating said compound in the presence of an addition product of anhydrous aluminum chloride and a nitrobenzene selected from the group consisting of nitrobenzene, alkyl substituted nitrobenzenes, halogen substituted nitrobenzenes, hydroxy substituted nitrobenzenes, and alkoxy substituted nitrobenzenes.

2. The method of claim 1 wherein the polychlorinated hydrocarbon compound is 1,1,1-trichlorethane.

3. The method of claim 1, wherein the polychlorinated hydrocarbon compound is 1,1,1,2-tetrachlorethane.

4. The method of claim 1 wherein the polychlorinated hydrocarbon compound is pentachlorethane.

5. The method of claim 1 wherein the nitrobenzene compound is nitrobenzene.

6. The method of claim 1 wherein the nitrobenzene is 2,5-dichloronitrobenzene.

7. The method of claim 1 wherein the nitrobenzene is p-nitrotoluene.

8. The method of claim 1 wherein the nitrobenzene is p-nitrochlorobenzene.

9. The method of claim 1 wherein the nitrobenzene is trinitrophenol.

10. The method of claim 1 wherein the nitrobenzene is o-nitrotoluene.

11. The method of claim 1 wherein the nitrobenzene is o-nitrochlorobenzene.

12. The method of claim 1 wherein the nitrobenzene is 2,4-dinitrophenol.

References Cited by the Examiner

UNITED STATES PATENTS

| | | | |
|---|---|---|---|
| 1,045,139 | 11/1912 | Graul | 260—659 |
| 1,235,283 | 7/1917 | Brooks et al. | 260—659 |
| 2,249,512 | 7/1941 | Wimmer et al. | 260—654 |
| 2,770,659 | 11/1956 | Bornhart | 260—653.1 |
| 2,989,570 | 6/1961 | Conrad et al. | 260—654 |

OTHER REFERENCES

Kharasch et al.: Jour. Amer. Chem. Soc. 61 (1934), pp. 3432–4.

BERNARD HELFIN, *Primary Examiner.*

LEON ZITVER, *Examiner.*

K. V. ROCKEY, *Assistant Examiner.*

UNITED STATES PATENT OFFICE
CERTIFICATE OF CORRECTION

Patent No. 3,304,336  February 14, 1967

William A. Callahan

It is certified that error appears in the above identified patent and that said Letters Patent are hereby corrected as shown below:

Column 2, lines 22 to 24, cancel "ethane may be passed over activated carbon at about 250° duced exists in an unsalable form. Also, pentachlornitrobenzene (nitrotoluenes), chlorinated nitrobenzenes" and insert -- ethylene. The by-product hydrogen chloride thus produced exists in an unsalable form. Also, pentachlorethane may be passed over activated carbon at about 250° --.

This certificate supersedes the Certificate of Correction issued October 10, 1967.

Signed and sealed this 3rd day of March 1970.

(SEAL)
Attest:

Edward M. Fletcher, Jr.  WILLIAM E. SCHUYLER, JR.
Attesting Officer  Commissioner of Patents